United States Patent
Aoki

(10) Patent No.: US 8,610,951 B2
(45) Date of Patent: Dec. 17, 2013

(54) PAGE DESCRIPTION DATA PROCESSING APPARATUS, PAGE DESCRIPTION DATA PROCESSING METHOD, AND RECORDING MEDIUM

(75) Inventor: Yasuharu Aoki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 636 days.

(21) Appl. No.: 12/916,116

(22) Filed: Oct. 29, 2010

(65) Prior Publication Data

US 2011/0102822 A1    May 5, 2011

(30) Foreign Application Priority Data

Oct. 30, 2009   (JP) .................................. 2009-250634

(51) Int. Cl.
*G06F 15/00*   (2006.01)

(52) U.S. Cl.
USPC ............. 358/1.9; 358/1.1; 358/1.18; 358/2.1; 358/2.99; 358/3.24; 358/3.26; 358/3.27; 382/162; 382/167; 382/173; 382/174; 382/178

(58) Field of Classification Search
None
See application file for complete search history.

(56) References Cited

FOREIGN PATENT DOCUMENTS

JP    2005-070957 A    3/2005

OTHER PUBLICATIONS

"Overprint Mode", Technical Note #5145, PostScript Version 3015.102, Adobe Systems Inc, Oct. 31, 2001.*
"Adobe Portable Document Format Version 1.3," PDF Reference, $2^{nd}$ edition, Adobe Systems Incorporated, pp. 108, 171 through 173, 185, ISBN 4-89471-338-1, 5th print, published Nov. 20, 2008, Pearson Education.

* cited by examiner

*Primary Examiner* — Paul F. Payer
(74) *Attorney, Agent, or Firm* — Sughrue Mion, PLLC

(57) ABSTRACT

Before page description data are input to a raster image processor (RIPa) that plots an overprint of a shading object in process colors in the nonzero overprint mode, the page description data are converted into robustized page description data wherein minimum values of process colors are replaced with small values which are not of 0. The robustized page description data are input to the RIPa.

6 Claims, 7 Drawing Sheets

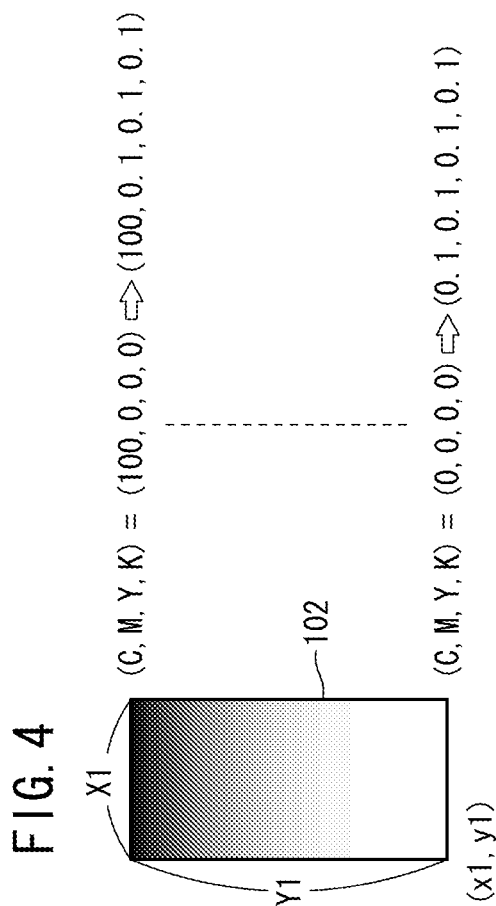

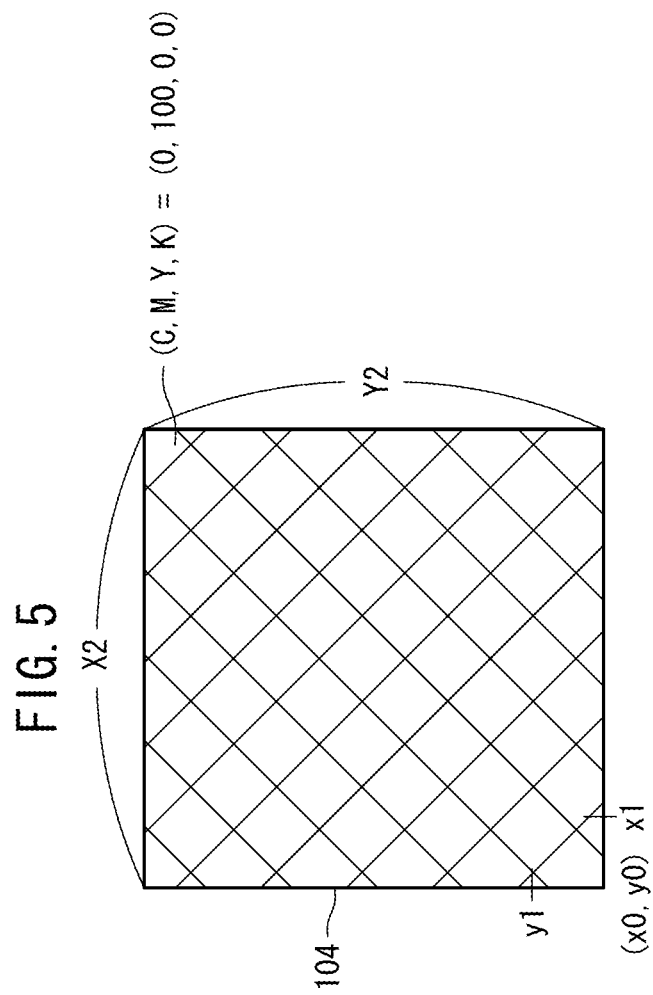

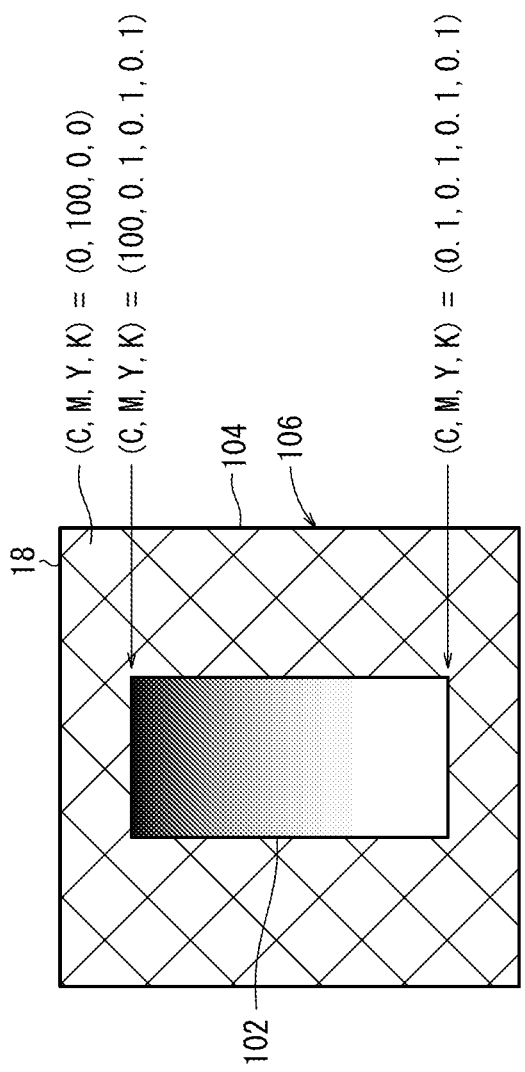

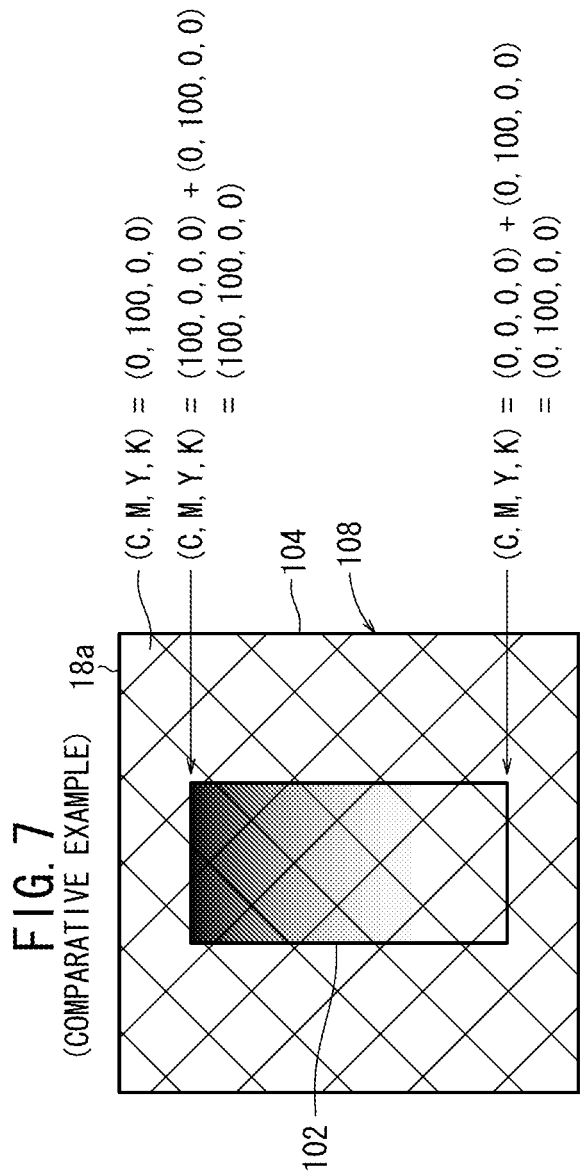

PAGE DESCRIPTION DATA PROCESSING APPARATUS, PAGE DESCRIPTION DATA PROCESSING METHOD, AND RECORDING MEDIUM

CROSS-REFERENCE TO RELATED APPLICATION

This application is based upon and claims the benefit of priority from Japanese Patent Application No. 2009-250634 filed on Oct. 30, 2009, of which the contents are incorporated herein by reference.

BACKGROUND OF THE INVENTION

1. Field of the Invention

The present invention relates to a page description data processing apparatus, a page description data processing method, and a recording medium for performing a particular processing sequence on page description data having a certain attribute, among page description data described by a page description language (PDL), thereby to convert the page description data into more robust page description data (hereinafter referred to as "robustized page description data").

2. Description of the Related Art

In recent years, DTP processes for setting characters and images generated by the operator with a computer into an electronic page using DTP (DeskTop Publishing) application software installed in the computer have been widely used in the printing and platemaking fields.

The DTP application software generates page description data which express images of respective pages based on elements such as characters and images edited by the operator.

The page description data are vector data independent of the resolution of an output machine such as a printer, a platesetter, or the like, and cannot be output per se from the output machine. Therefore, the page description data are rasterized by a RIP (Raster Image Processor) into raster image data comprising a cluster of dots representative of elements such as characters and images in pages.

When the raster image data are supplied to the output machine such as a printer, a platesetter, or the like, the output machine outputs a hard copy or a printing plate carrying an image based on the raster image data (see Japanese Laid-Open Patent Publication No. 2005-070957).

Generally, according to a page description language, process colors are designated as a set of four colors C, M, Y, K. For example, when an object in cyan C 30% is plotted against a background image in magenta M 50%, the object plotting area in cyan C 30% (C=30%, M=0%, Y=0%, K=0%) is expected to have a color tone of M 50%+C 30%.

According to a page description language such as PDF (Portable Document File), a nonzero overprint mode (overprint mode=(1)) (PDF Reference, 2nd edition, Adobe Portable Document Format Version 1.3, 1st edition, 5th print, published Nov. 20, 2008, Author: Adobe Systems, Publisher: Pearson Education, ISBN4-89471-338-1, pages 171 through 173, 108, 185, etc.) is designated to cause the object plotting area in cyan C 30% to have a color tone of M 50%+C 30% and also to cause the background image in M, Y, K to become the background image in magenta M 50%.

Specifically, in the nonzero overprint mode, when the process colors for the background image are designated as (C=0%, M=50%, Y=0%, K=0%) and the process colors for the object are designated as (C=30%, M=0%, Y=0%, K=0%), the object plotting area has a color tone of M 50%+C 30%, and the background image except the object plotting area has a color tone of M 50% as the process colors M=0%, Y=0%, K=0% for the object are handled as "transparent".

As defined in "PDF Reference, 2nd edition, Adobe Portable Document Format Version 1.3" referred to above, the nonzero overprint mode (overprint mode=(1)) is not applicable when the object is a shading object in smoothly varying process colors.

However, the market has seen an RIP for producing an overprint of a shading object in process colors in the nonzero overprint mode. If a hard copy or a print is output using such an RIP, then it is different from a hard copy or a print which is output from a normal RIP that does not plot an overprint of a shading object in process colors in the nonzero overprint mode.

SUMMARY OF THE INVENTION

It is an object of the present invention to provide a page description data processing apparatus, a page description data processing method, and a recording medium which make it possible to output a hard copy or a print from an RIP for plotting an overprint of a shading object in process colors in the nonzero overprint mode, which hard copy or print is essentially equivalent to a hard copy or a print which would be output from a normal RIP that does not plot an overprint of a shading object in process colors in the nonzero overprint mode.

A page description data processing apparatus, a page description data processing method, and a recording medium according to the present invention operate by confirming whether page description data contain a shading object or not, confirming whether a process color having a minimum value of 0 is contained in the shading object or not if the page description data contain the shading object, and converting the page description data into robustized page description data wherein the minimum value of 0 of the process color is replaced with a small value which is not of 0 if the process color having the minimum value of 0 is contained in the shading object.

According to the present invention, inasmuch as the RIP is supplied with robustized page description data wherein the minimum value of 0 of the process color is replaced with a small value which is not of 0 even if the RIP plots an overprint of a shading object in process colors in the nonzero overprint mode, it is possible to output a hard copy or a print which is essentially equivalent to a hard copy or a print which would be output from a normal RIP that does not plot an overprint of a shading object in process colors in the nonzero overprint mode.

A value replacer should preferably replace the minimum value of 0 of the process color with a small color tone value which is not of 0, e.g., 0.1% (0.001). An allowable upper limit value for the small color tone value is $1/255 \approx 0.004 = 0.4\%$ provided that a density which is one gradation higher than the value of 0 in an 8-bit gradation system is allowed.

If a density value is smaller than the gradation resolution of an output device such as a printer or the like, then it cannot be distinguished from the value of 0 on a product output from the output device such as a hard copy or the like.

According to the present invention, even if an RIP for plotting an overprint of a shading object in process colors in the nonzero overprint mode is used, since the minimum value of process colors in a shading object in a robustized page description data which have been converted is not of a value of 0, it is possible to obtain a hard copy or a print substantially equivalent to a hard copy or a print which would be obtained using a normal RIP that does not plot an overprint of a shading object in process colors in the nonzero overprint mode.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a schematic view showing an example of a shading object;

FIG. 5 is a schematic view showing an example of a path object as a background image;

FIG. 6 is a schematic view illustrative of a nonzero overprinting process according to the embodiment of the present invention; and FIG. 7 is a schematic view illustrative of a nonzero overprinting process according to a comparative example.

DESCRIPTION OF THE PREFERRED EMBODIMENTS

A publishing system which incorporates a page description data processing apparatus, a page description data processing method, and a recording medium according to an embodiment of the present invention will be described in detail below with reference to the drawings.

Figure 1:
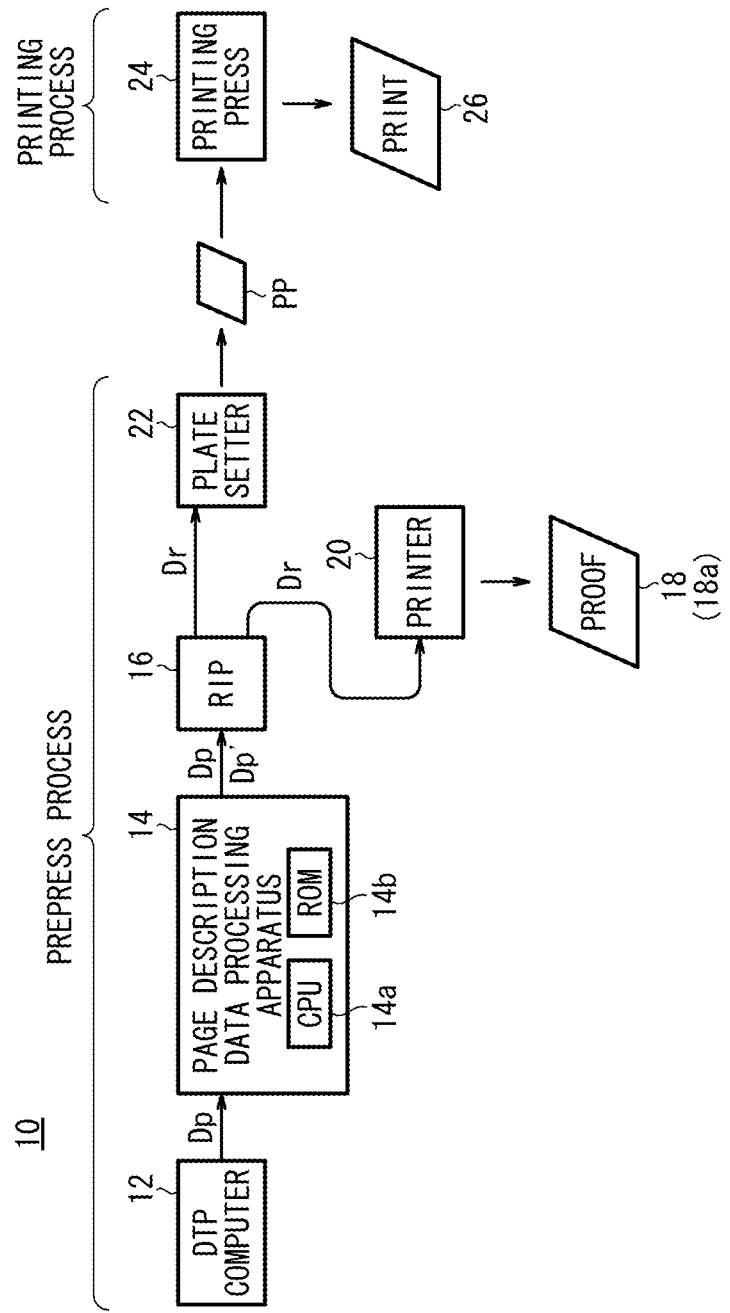
FIG. 1 is a block diagram of the entire publishing system according to an embodiment of the present invention.

FIG. 1 is a block diagram of an entire publishing system 10 according to an embodiment of the present invention.

The publishing system 10 is arranged to perform a prepress process, a printing process, and a bookbinding process (not shown).

The prepress process includes a DTP computer 12, a page description data processing apparatus 14 such as a personal computer or the like, an RIP 16, a printer 20, and a platesetter 22.

The DTP computer 12 generates page description data Dp which express images of respective pages based on elements such as characters and images edited by the operator.

The page description data processing apparatus 14 checks the contents (attributes) of the page description data Dp (in the form of PDF data in the present embodiment) output from the DTP computer 12, performs a particular processing sequence on the page description data Dp having a certain attribute based on the checked contents, and generates the processed page description data Dp as robustized page description data Dp' or outputs page description data Dp free of the certain attribute. The processing function of the page description data processing apparatus 14 may be incorporated in the DTP computer 12, so that the page description data processing apparatus 14 can be dispensed with.

The RIP 16 converts the page description data Dp or the robustized page description data Dp' output from the page description data processing apparatus 14 into raster image data Dr in C, M, Y, K.

Based on the raster image data Dr, the printer 20 prints a proof 18 (18a) as a hard copy.

If the proof 18 printed by the printer 20 is judged as acceptable by the operator, then the platesetter 22 generates and outputs printing plates PP in C, M, Y, K from the raster image data Dr output from the RIP 16 after the operator has turned on the start switch of the platesetter 22.

The printing process includes a printing press 24. The printing press 24 has printing plates PP in C, M, Y, K mounted therein which carry respective inks in C, M, Y, K and transfer them to a sheet of paper, thereby producing a print 26 in multiple colors (four colors).

Figure 2:
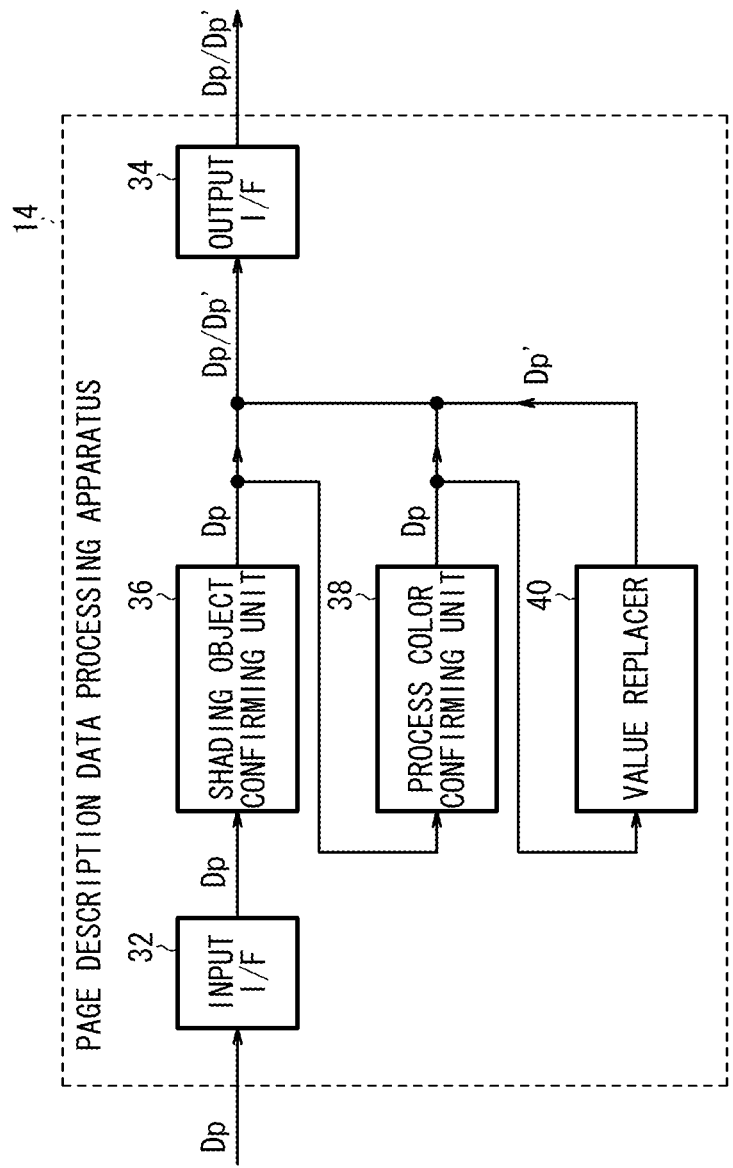
FIG. 2 is a functional block diagram of a page description data processing apparatus of the publishing system shown in FIG. 1.

FIG. 2 is a functional block diagram of the page description data processing apparatus 14. The page description data processing apparatus 14 has functions that are performed when a CPU 14$a$ (see FIG. 1) thereof executes a program stored in a ROM 14$b$ thereof. The program may be recorded and sold in a recording medium such as the ROM 14$b$, a CDROM or the like, or may be provided via an electric communication link.

The page description data processing apparatus 14 generates robustized page description data Dp' by analyzing page description data Dp supplied via an input interface (input I/F) 32 or generates unchanged page description data Dp, and outputs the robustized page description data Dp' or the unchanged page description data Dp via an output interface (output I/F) 34.

The page description data processing apparatus 14 comprises, in addition to the input and output interfaces 32, 34, a shading object confirming unit 36 involved in the analyzing process, a process color confirming unit 38, and a value replacer 40, as its functions.

The publishing system 10 is basically constructed as described above. Operation of the page description data processing apparatus 14 of the publishing system 10 will be described below with reference to a flowchart shown in FIG. 3.

Figure 3:
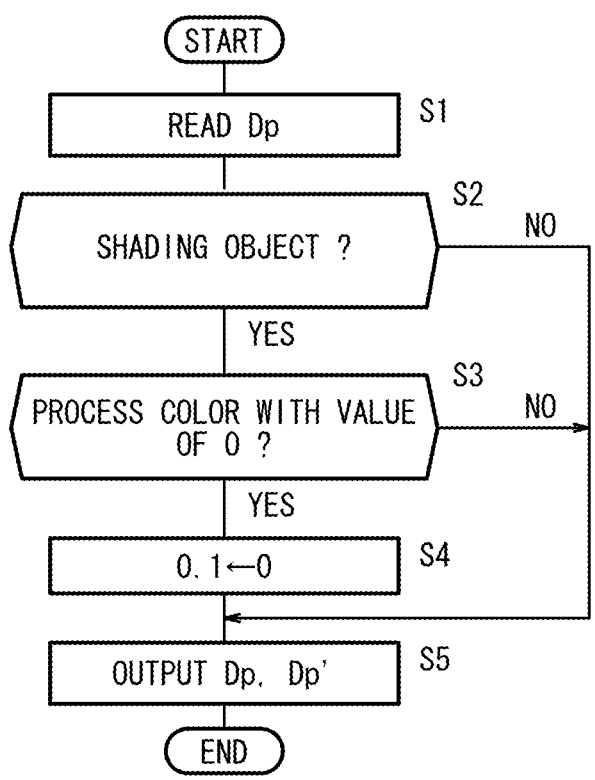
FIG. 3 is a flowchart of a processing sequence of the page description data processing apparatus shown in FIG. 2.

In step S1 shown in FIG. 3, the page description data processing apparatus 14 reads page description data Dp, page by page, which are output from the DTP computer 12.

In step S2, the shading object confirming unit 36 confirms whether the page description data Dp contain a shading object as a certain attribute or not. Specifically, a parser (PDF access library), not shown, of the page description data processing apparatus 14 analyzes the page description data Dp (PDF data), and extracts objects from the page description data Dp. The shading object confirming unit 36 determines whether a shading object is contained in the extracted objects or not.

If a shading object is not contained in the extracted objects (NO in step S2), then the page description data processing apparatus 14 does not change the page description data Dp and outputs the unchanged page description data Dp via the output interface 34 in step S5.

If a shading object is contained in the extracted objects (YES in step S2), then the process color confirming unit (0-value process color confirming unit) 38 confirms whether a process color having a minimum value of 0 is contained in the shading object or not in step S3.

As schematically shown in FIG. 4, if a plotted region 102 has a prescribed range (X1×Y1) and position (x1, y1), and contains process colors smoothly varying from process colors (C, M, Y, K)=(100, 0, 0, 0) wherein cyan C 100%, magenta M 0%, yellow Y 0%, and black K 0% to (C, M, Y, K)=(0, 0, 0, 0) wherein cyan C 0%, magenta M 0%, yellow Y 0%, and black K 0%, then the answer to step S3 is affirmative.

If a process color having a minimum value of 0 is not contained in the shading object in step S3 (NO in step S3), then the page description data processing apparatus 14 does not convert (process) the page description data Dp and outputs the unchanged page description data Dp via the output interface 34 in step S5.

If the answer to step S3 is affirmative in step S3, i.e., if the plotted region 102 shown in FIG. 4 represents a shading object and contains process colors having a minimum value of 0, then the value replacer 40 replaces the minimum value of 0 with a small value which is not of 0, i.e., a minimum color tone value of 0.1% (0.001) which is not of 0 in the present embodiment, in step S4.

Specifically, in FIG. 4, the value replacer 40 replaces the values of 0 in the process colors (C, M, Y, K)=(100, 0, 0, 0) wherein cyan C 100%, magenta M 0%, yellow Y 0%, and black K 0% with (C, M, Y, K)=(100, 0.1, 0.1, 0.1) as indicated by the upper outlined arrow, and replaces the values of 0 in the process colors (C, M, Y, K)=(0, 0, 0, 0) wherein cyan C 0%, magenta M 0%, yellow Y 0%, and black K 0% with (C, M, Y, K)=(0.1, 0.1, 0.1, 0.1) as indicated by the lower outlined arrow.

Robustized page description data Dp' are thus generated which include the converted shading object whose process colors do not have a minimum value of 0. The robustized page description data Dp' are then output via the output interface 34 to the RIP 16 in step S5.

If the data description data Dp include a background image 104 of a path object ending with a paint operator for filling a rectangular path whose plotted region has a prescribed range (X2×Y2) and position (x0, y0), with solid magenta 100%, and the plotted region 102 of the shading object shown in FIG. 4 is plotted in the background image 104, then an image output as a proof 18 based on raster image data Dr from the RIP 16 is formed as shown in FIG. 6.

Even if the RIP 16 is an RIP which plots an overprint of a shading object in process colors in the nonzero overprint mode, since the minimum value of the process colors in the shading object in the robustized page description data Dp' which have been converted is not of a value of 0 but of a value of 0.001 (0.1%), it is possible to obtain a proof 18 with a combined image 106 where the plotted region 102 is plotted on the background image 104 shown in FIG. 6 according to a so-called knockout process, the proof 18 being equivalent to (approximating) a proof which would be obtained using a normal RIP that does not plot an overprint of the plotted region 102 of a shading object in process colors in the nonzero overprint mode.

The value replacer 40 should preferably replace the minimum value of 0 of the process colors with a small value which is not of 0 when there is an instruction to plot an overprint of a shading object (overprint mode=(1)).

FIG. 7 shows a proof 18a with a combined image 108 according to a comparative example which corresponds to page description data Dp including minimum values of 0 of process colors in a shading object, the combined image 108 being generated by an RIP which plots an overprint of a shading object in process colors in the nonzero overprint mode. When the combined image 108 is output by such an RIP, an uppermost plotted region in C 100% within the plotted region 102 contains process colors (C, M, Y, K)=(100, 100, 0, 0) and a lowermost plotted region in C 0% within the plotted region 102 contains process colors (C, M, Y, K)=(0, 100, 0, 0). Therefore, a page image is reproduced which is different from a page image which would be obtained using a normal RIP that does not plot an overprint of the plotted region 102 of a shading object in process colors shown in FIG. 6 in the nonzero overprint mode.

Although a certain preferred embodiment of the present invention has been shown and described in detail, it should be understood that various changes and modifications may be made therein without departing from the scope of the appended claims.

What is claimed is:

1. A page description data processing apparatus comprising:
    a shading object confirming unit for confirming whether page description data contain a shading object or not;
    a process color confirming unit for confirming whether a process color having a minimum value of 0 is contained in the shading object or not if the page description data contain the shading object; and
    a value replacer for replacing the minimum value of 0 of the process color with a small value which is not of 0 if the process color having the minimum value of 0 is contained in the shading object wherein the page description data processed by the processing apparatus are further processed by a Raster Image Processor which produces an overprint of a shading object in process colors in the nonzero overprint mode.

2. A page description data processing apparatus according to claim 1, wherein the value replacer replaces the minimum value of 0 of the process color with a small value which is not of 0 when there is an instruction to plot an overprint of the shading object.

3. A page description data processing apparatus according to claim 2, wherein the value replacer replaces the minimum value of 0 of the process color with a minimum color tone value which is not of 0.

4. A page description data processing apparatus according to claim 1, wherein the value replacer replaces the minimum value of 0 of the process color with a minimum color tone value which is not of 0.

5. A page description data processing method comprising the steps of:
    confirming whether page description data contain a shading object or not;
    confirming whether a process color having a minimum value of 0 is contained in the shading object or not if the page description data contain the shading object; and
    replacing the minimum value of 0 of the process color with a small value which is not of 0 if the process color having the minimum value of 0 is contained in the shading object wherein the page description data according to the method are further processed by a Raster Image Processor which produces an overprint of a shading object in process colors in the nonzero overprint mode.

6. A non-transitory recording medium storing a program for enabling a computer to check an attribute of page description data and perform a processing sequence on the page description data depending on the checked attribute, the program further enabling the computer to function as:
    a shading object confirming unit for confirming whether page description data contain a shading object or not;
    a process color confirming unit for confirming whether a process color having a minimum value of 0 is contained in the shading object or not if the page description data contain the shading object; and
    a value replacer for replacing the minimum value of 0 of the process color with a small value which is not of 0 if the process color having the minimum value of 0 is contained in the shading object wherein the page description data are further processed by a Raster Image Processor which produces an overprint of a shading object in process colors in the nonzero overprint mode.

* * * * *